J. A. ST. JOHN.
CORN HARVESTER.
APPLICATION FILED JUNE 6, 1918.
1,306,317.
Patented June 10, 1919.
3 SHEETS—SHEET 1.
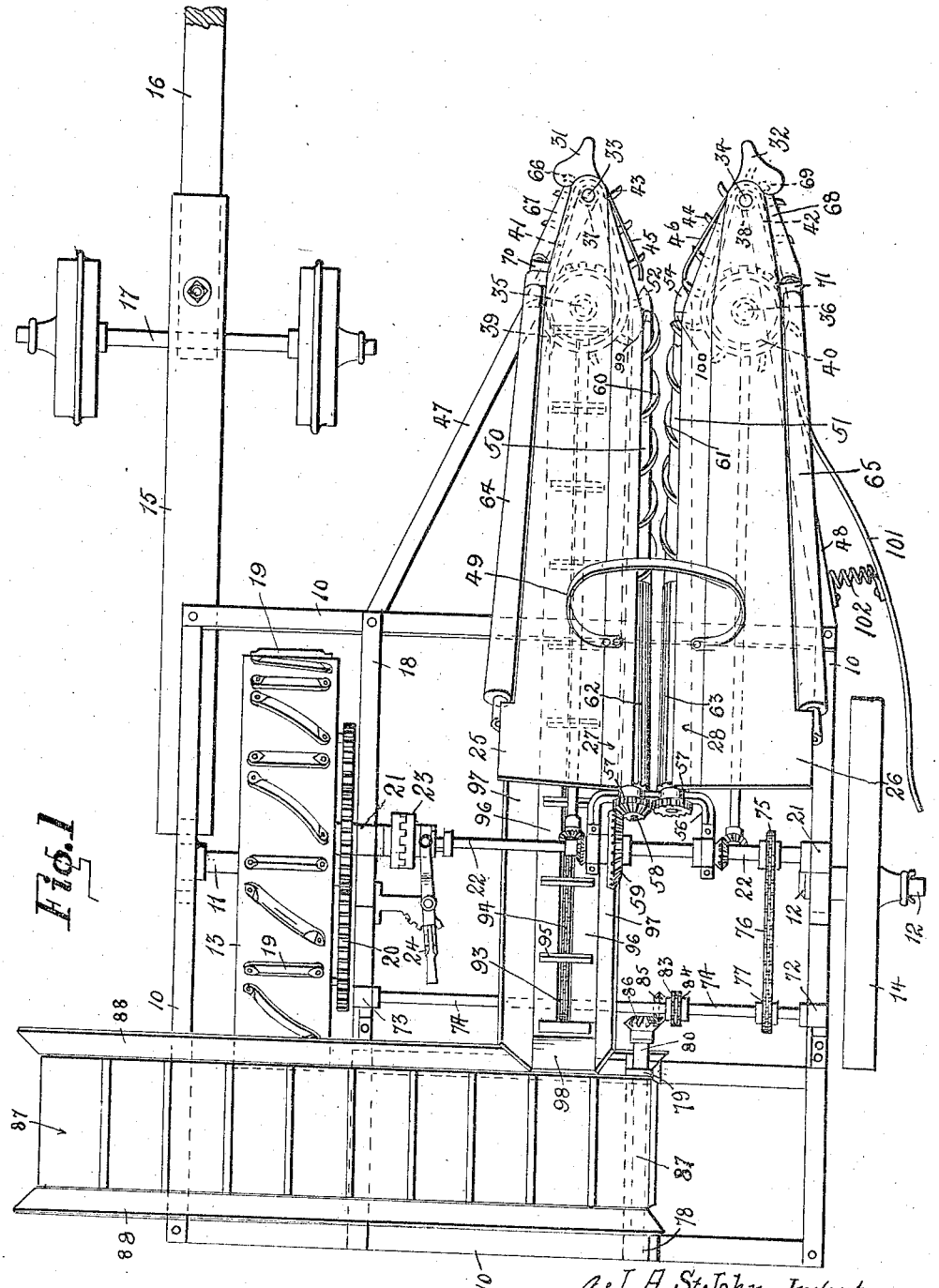
J. A. St John, Inventor.
By Lacey & Lacey, Attorneys.

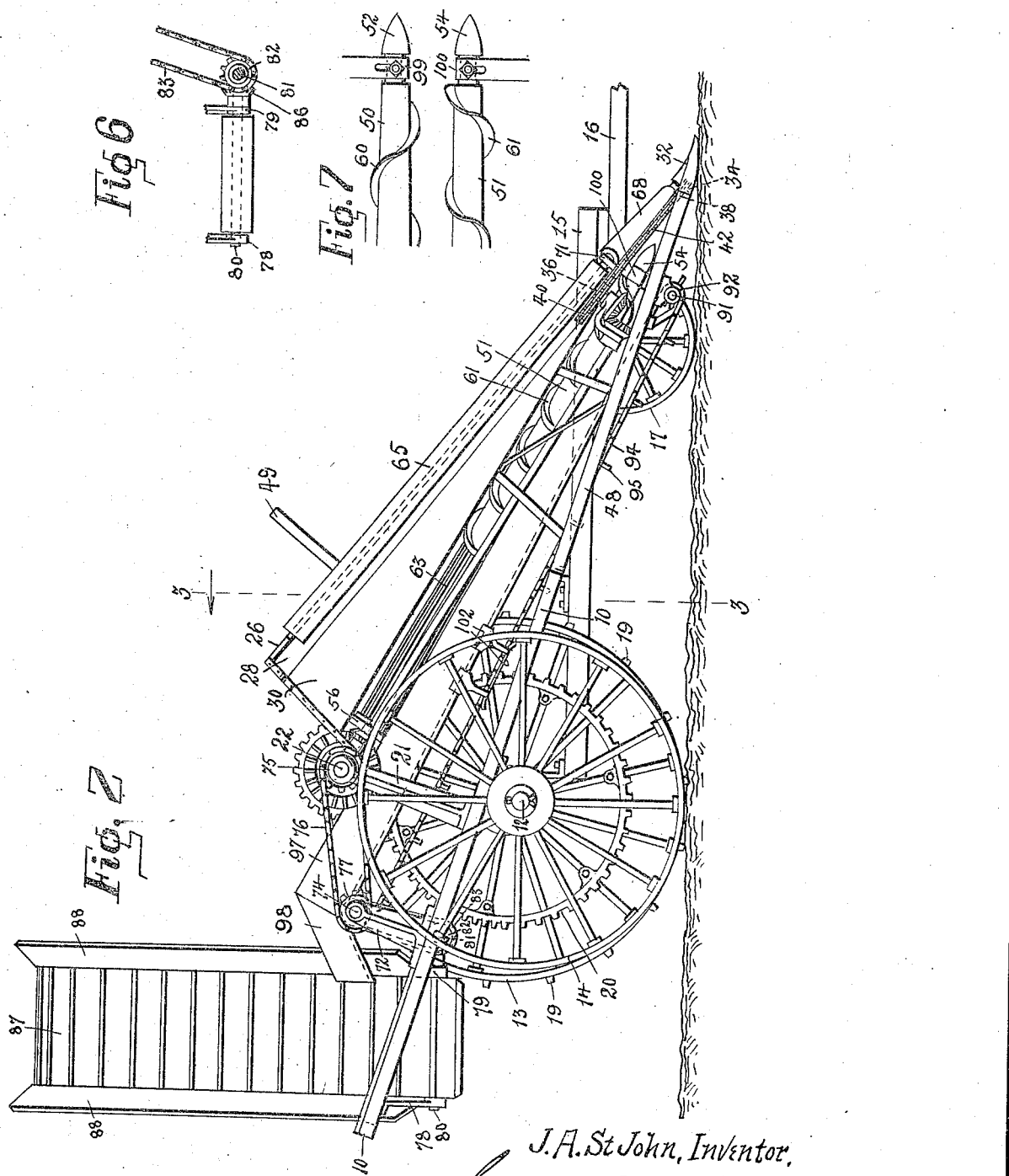

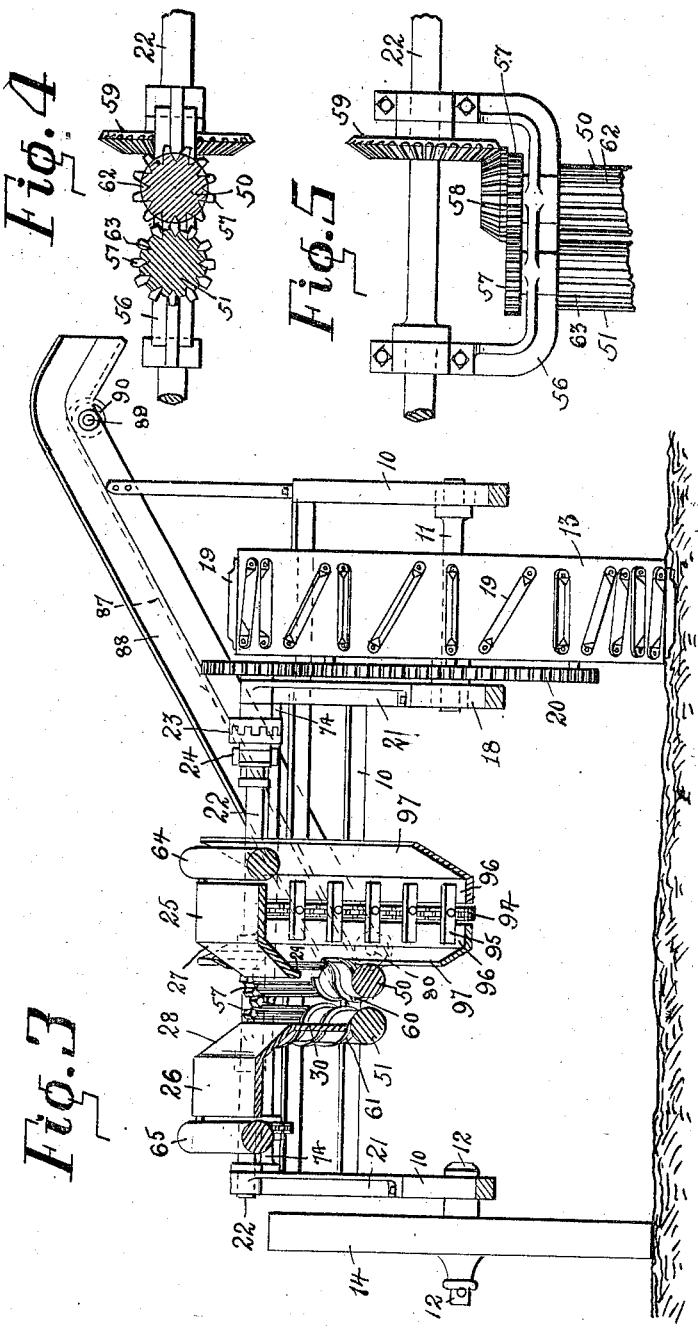

UNITED STATES PATENT OFFICE.

JESSE A. ST. JOHN, OF DECATUR, ILLINOIS.

CORN-HARVESTER.

1,306,317.  Specification of Letters Patent.  Patented June 10, 1919.

Application filed June 6, 1918. Serial No. 238,537.

*To all whom it may concern:*

Be it known that I, JESSE A. ST. JOHN, a citizen of the United States, residing at Decatur, in the county of Macon and State of Illinois, have invented certain new and useful Improvements in Corn-Harvesters, of which the following is a specification.

The object of the invention is to provide a machine which may be drawn over a field and operated to remove ears of corn from standing stalks and adapted to deliver the said ears with the husks thereon into a wagon or other receptacle drawn over the field alongside the harvesting machine. The invention seeks to provide a construction by which corn stalks which may be bent over or lying upon the ground will be caused to assume an approximately erect position before the ears of corn are removed therefrom and the ears of corn "snapped" from the stalks after the same have been raised. Other incidental objects will appear as the description proceeds, and the invention resides in certain novel features which are illustrated in the accompanying drawings, and will be specifically pointed out in the claims following the detailed description.

In the drawings:

Figure 1 is a plan view of a harvesting machine embodying the improvements;

Fig. 2 is a side elevation;

Fig. 3 is a transverse section on the line 3—3 of Fig. 2, looking in the direction of the arrow.

Fig. 4 is an enlarged sectional detail of the upper portions of the husking rolls illustrating the manner of operating the same, Fig. 5 is a plan view of the parts shown in Fig. 4, Fig. 6 is a detail view illustrating the manner of operating the lateral conveyer belt, Fig. 7 is a detail view illustrating the construction and adjustment of the forward ends of the husking rolls.

In carrying out the invention, a main frame 10 is employed which may be of any desired dimensions and is equipped at its sides with stub axles 11—12 upon which are mounted ground wheels 13 and 14, a support 15 for the pole or tongue 16 being secured to and extending forwardly from the frame at one side, as shown in Fig. 1. The extension 15 is preferably provided with a suitable tongue truck represented at 17.

The main frame 10 is preferably inclined, as shown. The ground wheel 14 is located outside the frame 10 at one side and may have a relatively narrow tread, but the ground wheel 13 is disposed between the other side of the frame and a longitudinally directed beam 18 forming a part of the frame. The wheel 13 has a relatively wide tread and carries traction shoes 19 preferably arranged to extend both longitudinally and transversely of the tread of the wheel, as shown in Fig. 1, to engage the ground and increase the tractive force and effectually prevent slipping or skidding of the wheel. At the inner side of the traction wheel 13 a gear wheel 20 is connected. Rising respectively from the frame 10 and beam 18 are standards 21 rotatively supporting the main drive shaft 22. A clutch 23 of any preferred style is provided to connect the main shaft 22 with and disconnect it from the traction wheel. The clutch device is controlled by a lever 24 within reach of the operator.

The forward member of the frame 10 is divided intermediate the ends to permit the machine to pass over the corn stalks. Supported above the frame member and extending in advance of the same are shield members comprising flat upper portions 25 and 26 with their confronting edges directed downwardly and toward the medial line of the space between them as shown at 27—28. Depending from the inner edge of the inclined portion 27 of the shield member and forming a continuation thereof is a relatively narrow vertical portion 29, while a relatively wide vertical portion 30 depends from the inner edge of the shield portion 28 and forms a continuation thereof, the object to be hereafter explained. All of the shield members converge toward the forward end as represented in Figs. 1 and 2 and are provided at their forward ends with shoe devices 31—32 which form dividers spaced at considerable distances and adapted to pass upon either side of the stalks of the row of corn with which the machine is to be engaged. The shield members thus define a diverging entrance or passage-way which merges into the space between vertical portions 29—30 of the shield.

Mounted for rotation in the shield members rearwardly of the shoe devices 31—32 are vertical shafts 33—34, and suitably supported beneath the shield devices rearwardly of the divider shoes are other shafts 35—36. The shafts 33—34 carry relatively small chain wheels, indicated at 37—38, while the shafts 35—36 carry large chain wheels indicated at 39—40. An endless chain, indicated at 41, operates over the chain wheels 37 and 39, while a similar endless chain, indicated at 42, operates over the chain wheels 39—40. The chain 41 is provided with a plurality of projecting fingers 43, while the chain 42 is provided with a plurality of similar fingers 44. Portions of the fingers project beyond the confronting faces of the converging shield members as the chain are rotated and disappear beneath the shield members as the chains pass around the larger chain wheels. By this means the fingers operate as gathering devices within the "throat" portion of the passage and engage the stalks of corn and convey them toward the contracted space between the portions 29—30 of the shield devices.

Resilient guard members 45—46 are connected to the forward portions of the shield devices and project rearwardly and inwardly toward each other, and serve as guards to prevent the stalks from becoming entangled in the fingers. The forward portions of the shield devices including the shoes 31—32 are supported from the frame member 10 by diagonal braces 47—48, while the shield members are connected by an upwardly arching strap or brace 49. The member 49 serves to support the shield members from lateral displacement, and the shield members are further supported by being connected to the confronting ends of the divided forward member of the frame 10 previously mentioned. By this means the shield members are not only firmly supported but the divided frame member is likewise supported and prevented from displacement. The arching member 49 will be sufficiently large to permit the stalks of corn to pass beneath it as the machine is moved forward but will direct toward the center of the space between the rollers all stalks which may be leaning upon either shield so that the ears of corn which may be upon the upper ends of the stalks will be directed to the snapping rollers and will be received by them in the proper position for effectual operation of the rollers.

Mounted for rotation beneath the shield members and projecting into the space between the portions 29—30, are a pair of snapping rolls indicated as a whole at 50—51. At its forward end the roll 50 is supported for rotation in a bearing 52 with its forward end in advance of the bearing and pointed as shown, while the roller 51 is similarly supported by a bearing 54 and with its forward end pointed as shown. The rollers 50—51 increase in diameter toward their rear ends as shown, and are mounted for rotation at their larger rear ends in a yoke frame 56, the latter connected by suitable bearings to the drive shaft 22. Means are provided for simultaneously rotating the snapping rolls from the shaft 22 and any suitable mechanism may be employed for transmitting this motion. For the purpose of illustration the journals of the snapping rolls are provided with gears 57 which engage with each other, and one of the journals of one of the snapping rolls, for instance the roll 50, is provided with a beveled gear 58 engaging with a larger beveled gear 59 on the shaft 22. By this means the rotation of the shaft 22 will be communicated to the snapping rolls at increased speed, and the speed may be controlled by changing the relative sizes of the gears 58—59.

The major portion of the lengths of the snapping rolls are provided respectively with ribs 60—61 arranged screw or augerlike as shown, the ribs of one roll disposed opposite the spaces between the ribs of the other roll. The ribs cause the snapping rolls when rotated toward each other to operate in an auger-like manner upon the stalks of corn and "snap" the ears therefrom, as hereafter described.

The remaining portions of the rolls 50—51 are respectively grooved longitudinally as indicated at 62—63, the grooves being preferably V-shaped transversely, as shown in Fig. 4.

Mounted for rotation at the outer edge of the frame portion 25 of the shield member is a tapered roll 64, and a similar tapered roll 65 is mounted for free rotation at the outer edge of the flat portion 26 of the shield member. Mounted for rotation in the shoe 31 as indicated at 66, is a relatively small tapered roll 67, while a similar small tapered roll 68 is mounted for rotation as indicated at 69 in the shoe 32. At its rear end the small roll 67 is journaled in the bearing, indicated at 70, in which the forward end of the roll 64 is journaled while the rear end of the small roll 68 is journaled in the bearing indicated at 71 in which the forward end of the tapered roll 65 is journaled. By this means the roll members 64—67 and 65—68 freely rotate in unison, so that fallen or leaning stalks may be raised and supported in proper position to be acted upon by the snapping rollers and the ears will not be cut or dragged from the stalks as they pass over the outer edges of the shields.

Rising from the frame 10 at one side is a standard 72, and rising from the beam 18 is a similar standard 73, the standards supporting a counter shaft 74 at their upper ends. Connected to the shaft 22 is a chain wheel 75 over which a chain 76 leads to a chain wheel 77 on the shaft 74. By this means the motion of the shaft 22 is communicated to the shaft 74. Depending from the rear members of the frame 10 are hangers 78—79, carrying a shaft 80. Mounted for rotation in the lower portions of the standards 72—73 is another counter shaft, indicated at 81, and carrying a chain wheel, indicated at 82, over which a chain 83 leads to a chain wheel 84 on the shaft 74. The shaft 81 carries a beveled gear 85 which engages with a similar beveled gear 86 on the shaft 80. By this means the rotation of the shaft 74 is communicated to the shaft 80. The shaft 80 is provided with a drum, over which an endless belt 87 operates, the latter carrying slats at spaced intervals. The shaft 80 likewise supports side members 88 in the upper end of which another shaft 89 is mounted for rotation and carries a drum to receive the upper portion of the slatted belt 87. The members 88 form the frame of a conveyer device of which the slatted belt is the operating element, and is supported obliquely to the line of travel of the machine, and is designed to convey the snapped or separated ears of corn to a suitable receptacle such as a wagon or the like, not shown.

Mounted for rotation beneath the brace member 47 is a shaft 91, carrying a chain wheel 92 and mounted for rotation upon the shaft 74 is a chain wheel 93. An endless chain 94 operates over the chain wheels 92 and 93 and is provided with a plurality of conveyer buckets or slats 95 in spaced relation. The conveyer members 95 operate within a guide trough comprising bottom members 96 and inclined side members 97. The belt 94 with its slats 95 coact with the guide members 96—97 to constitute a conveyer operating in a rearwardly and upwardly inclined position, the trough terminating in a chute 98 adapted to guide the snapped ears to the lateral conveyer belt 87.

As the machine is drawn forwardly the shoes 31—32 and the inclination of the rollers and the parts immediately adjacent the same will lift the fallen stalks and cause the same to assume an approximately erect position and prevent the stalks falling backward and dropping into the space between the rollers and clog the operation.

The loosely mounted rollers 64—65 will permit the bent over stalks to assume an erect position and move transversely relatively to the guides without stripping the ears of corn therefrom. It will be noted that the rollers 67—68 are disposed out of axial alinement with the rollers 64—65 and are also tapered toward their front ends, this arrangement permitting the rollers to readily pass under the fallen stalks and apply a lifting force close to the root or base of the stalks. It will also be noted that the forward extremities 52—55 of the snapping rollers are sharply tapered so that ample space for the entrance of the stalks between the rollers is provided.

The bearings 99—100 for the forward ends of the husking rolls are adjustably supported as shown in Fig. 7 so that the degree of divergence of the forward terminals 52—54 may be varied as circumstances may suggest.

The operation of the machine is thought to be evident from the foregoing description, taken in connection with the accompanying drawings, and further reference thereto is deemed unnecessary.

A guard 101 is attached to the diagonal brace member 48 and is rendered yieldable by a spring 102 to protect the ground wheel 14.

The chain 94 of the horizontal conveyer may be supported intermediate its lower side, as shown at 103.

Having thus described the invention, what is claimed as new is:

1. In a corn-harvester, the combination with a frame, of a pair of snapping rollers disposed longitudinally thereon and provided peripherally with beads adapted to engage the ears of corn, a conveyer disposed at one side of the snapping rollers, a shield disposed at the other side of the snapping rollers and extending down close to the adjacent roller to prevent escape of ears of corn at that side of the machine, loosely mounted rollers upon the extreme outer edge of the shield and at the extreme outer side of the conveyer, and means for operating the snapping rollers and the conveyer.

2. In a corn-harvester, the combination of a frame, a pair of snapping rollers mounted longitudinally upon the frame, a pair of guides extending forwardly from the snapping rollers and having their inner opposed edges diverging forwardly, the front ends of the guides and the snapping rollers being lower than their rear ends, loosely mounted rollers upon the guides at the front ends and the outer sides of the same, and means for operating the snapping rollers.

3. In a corn harvester, the combination of a frame, a pair of longitudinally disposed snapping rollers mounted upon the frame and inclining downwardly toward their front ends, a longitudinally disposed conveyer arranged at the inner side of the inner snapping roller and extending rearwardly beyond the same, an elevator disposed transversely upon the frame adjacent the rear end of the conveyer and extending beyond the side of the frame, means upon the frame for operating the snapping rollers, the conveyer and the elevator, and longitudinally disposed shields arranged over the snapping rollers and the conveyer, the shield over the outer roller having its inner portion extending downwardly and terminating immediately over the said outer roller and the shield over the conveyer and the inner roller having its inner portion extending downwardly toward but terminating short of the said inner roller.

4. The improved corn harvester herein disclosed comprising a wheeled frame, a pair of opposed coacting snapping rollers rotatably mounted on the frame and extending downwardly and forwardly, downwardly and forwardly extending shields supported on the frame above the snapping rollers, the forward extremities of each shield being tapered, shoes at the forward extremity of the shields, endless feeder chains disposed beneath the shields between the shoes and the forward extremities of the snapping rollers, fingers carried by said chains and projecting beyond the inner sides of the shields, resilient guards secured at their front ends adjacent the shoes and extending longitudinally over the said fingers, forwardly tapered rollers mounted loosely on the forward ends of the shields at the outer sides of the same, other rollers mounted loosely on the outer edges of the shields in rear of the tapered rollers, a longitudinally extending conveyer arranged at the inner side of the inner snapping roller, a transverse elevator disposed in rear of the conveyer, and means for operating the elevator, the conveyer, the snapping rollers and the feeder shoes.

In testimony whereof I affix my signature.

JESSE A. ST. JOHN. [L. S.]

Copies of this patent may be obtained for five cents each, by addressing the "Commissioner of Patents, Washington, D. C."